United States Patent
Lindacher et al.

(10) Patent No.: US 7,101,041 B2
(45) Date of Patent: Sep. 5, 2006

(54) CONTACT LENSES FOR CORRECTING SEVERE SPHERICAL ABERRATION

(75) Inventors: Joseph Michael Lindacher, Lawrenceville, GA (US); Courtney Flem Morgan, Alpharetta, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/093,820

(22) Filed: Mar. 30, 2005

(65) Prior Publication Data

US 2005/0219458 A1    Oct. 6, 2005

Related U.S. Application Data

(60) Provisional application No. 60/558,498, filed on Apr. 1, 2004.

(51) Int. Cl.
  G02C 7/04    (2006.01)
  G02C 7/02    (2006.01)

(52) U.S. Cl. .................. 351/160 R; 351/177
(58) Field of Classification Search ........... 351/160 R, 351/160 H
  See application file for complete search history.

(56) References Cited

U.S. PATENT DOCUMENTS

| | | | |
|---|---|---|---|
| 3,482,906 A | 12/1969 | Volk | 351/160 |
| 3,933,411 A | 1/1976 | Winner | 351/160 |
| 4,195,919 A | 4/1980 | Shelton | 351/160 |
| 4,199,231 A | 4/1980 | Evans | 351/160 |
| 4,580,882 A | 4/1986 | Nuchman et al. | 351/161 |
| 5,050,981 A | 9/1991 | Roffman | 351/177 |
| 5,220,359 A | 6/1993 | Roffman | 351/177 |
| 5,691,797 A | 11/1997 | Seidner et al. | 351/161 |
| 5,771,088 A | 6/1998 | Perrott | 351/161 |
| 5,815,239 A | 9/1998 | Chapman et al. | 351/177 |
| 6,244,708 B1 | 6/2001 | Chapman et al. | 351/160 |
| 6,286,956 B1* | 9/2001 | Oyama et al. | 351/161 |
| 6,390,624 B1* | 5/2002 | Hough | 351/177 |
| 6,457,826 B1 | 10/2002 | Lett | 351/161 |
| 6,923,540 B1* | 8/2005 | Ye et al. | 351/161 |
| 2002/0159025 A1 | 10/2002 | Legerton et al. | 351/160 |

FOREIGN PATENT DOCUMENTS

| | | |
|---|---|---|
| WO | WO 94/23327 | 10/1994 |
| WO | WO 02/084381 | 10/2002 |
| WO | WO 03/032825 | 4/2003 |

OTHER PUBLICATIONS

European Standard Search Report PCT EP2005/00383, Jul. 29, 2005.
Chateau, Blanchard and Baude "Influence of Myopia and Aging on the Optimal Spherical Aberration of Soft Contact Lenses" vol. 15, No. 9 / Sep. 1998, J. Opt. Soc. Am. A., pp. 2589-2596.
Artal, Ferro, Miranda, and Navarro "Effects of Aging in Retianl Image Quality", J. Opt. Soc. Am. A. / vol. 10, No. 7/ Jul. 1993, pp. 1656-1662.
Anstice "Astigmatism—Its Componenets and their CHanges with Age", 1971, American Journal of Optometry and Archives of American Acadmey of Optometry, 1001-1006.
Jenkins "Aberrations of the Eye and their Effects on Vision: Part I", National Library of Midicine, pp. 59-91.
On and Off-Eye spherical Abberation of Soft Contact Lenses and Consequent Changes of Effective Lens Power, , Holger H. Dietze, et al, Optometry and Vision Science, vol. 80, No. 2, Feb. 2003, pp. 126-134.

* cited by examiner

Primary Examiner—Jordan M. Schwartz
(74) Attorney, Agent, or Firm—Jian Zhou

(57) ABSTRACT

The present invention is related to a contact lens for correcting severe spherical aberration. The contact lens of the invention comprises an anterior surface having a first optical zone and an opposite posterior surface having a second optical zone. The first optical zone is defined by a mathematical function including a conic term and at least one $4^{th}$ or higher order mathematic term. The first optical zone, in combination with the second optical zone, provides a power profile in which the optical power of the lens decreases outwardly from the optical axis to the outer periphery such that the optical power at a 6 mm diameter is from about 1 to 5 diopters smaller than a manifest refractive power for an eye. The present invention also provides a series of contact lenses and a method for making contact lenses of the invention.

20 Claims, No Drawings

CONTACT LENSES FOR CORRECTING SEVERE SPHERICAL ABERRATION

This application claims the benefit under 35 USC § 119 (e) of U.S. provisional application 60/558,498 filed Apr. 1, 2004, incorporated by reference in its entirety.

The present invention is related to contact lenses, more specifically to an contact lens for severe spherical aberration.

BACKGROUND OF THE INVENTION

Vision defects can be corrected by performing corneal refractive surgical procedures, including, for example, photorefractive keratectomy (or PRK), Laser-Assisted In Situ Keratomileusis (or LASIK), Laser-Assisted Sub-Epithelial Keratectomy (or LASEK), contact or non-contact Thermal Keratoplasty (or TK/CK). However, all of these corneal refractive surgical procedures cause an irreversible modification to the shape of the cornea in order to effect refractive changes, and if the correct refraction is not achieved by the first procedure, a second procedure or enhancement must be performed. Additionally, the long term stability of the correction is somewhat variable because of the variability of the bio-mechanical wound healing response between patients. In addition, there may be higher order refractive errors induced by corneal refractive surgical procedures. One of such higher order refractive errors is spherical aberration, which typically results in degraded night vision—when the pupils are dilated. It could be risky to perform a second corneal refractive surgery to correct the spherical aberration induced in the first procedure, because it involves removing more tissue from an already thin cornea. Therefore, there is a need for correcting spherical aberration.

SUMMARY OF THE INVENTION

The present invention, in one aspect, provides a contact lens for correcting severe spherical aberration. The contact lens of the invention comprises an optical axis, a posterior surface having a first optical zone and an opposite anterior surface having a second optical zone. The first optical zone is defined by a mathematical function including a conic term and at least one $4^{th}$ or higher order mathematic term. The first optical zone, in combination with the second optical zone, provides a negative spherical aberration of from about 1 diopter to about 5 diopters at a 3 mm radius from the optical axis.

The invention, in another aspect, provides a method for producing a contact lens of the invention as described above. The method comprises the steps of the shaping a contact lens by a manufacturing means to have an optical axis, an anterior surface having a first optical zone, and an opposite posterior surface having a second optical zone. The first optical zone is defined by a mathematical function including a conic term and at least one $4^{th}$ or higher order mathematic term. The first optical zone, in combination with the second optical zone, provides a negative spherical aberration of from about 1 diopter to about 5 diopters at a 3 mm radius from the optical axis.

In a further aspect, the present invention provides a series of contact lenses capable of correcting different vision deficiencies, wherein each contact lens in the series comprises an optical axis, an anterior surface having a first optical zone and an opposite posterior surface having a second optical zone, wherein the posterior surface of each lens in the series is substantially identical to each other. The first optical zone of each lens is defined by a mathematical function including a conic term and at least one $4^{th}$ or higher order mathematic term. The first optical zone of each lens, in combination with its opposite second optical zone, provides a negative spherical aberration of from about 1 diopter to about 5 diopters at a 3 mm radius from the optical axis.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In one aspect, the present invention relates to a contact lens for correcting severe spherical aberration. As used herein, a "severe spherical aberration refers to spherical aberration of from about 1 to about 5 diopters of a human eye at a 6 mm diameter pupil. The spherical aberration can be an inherent high order aberration of an eye or the combination of an inherent spherical aberration and a refractive surgery-induced spherical aberration of an eye. A typical human eye, as a result of the optical characteristics of the cornea and crystal lens, inherently exhibits an increasing amount of spherical aberration as the diameter of the pupil expands. Typically, the spherical aberration, of an adult, is about one diopter at a 6 mm diameter pupil, while the spherical aberration is slightly less than two diopters at an 8 mm pupil, regardless of the eye's sphero-cylindrical manifest refraction.

In accordance with the present invention, a contact lens of the invention comprises an optical axis, an anterior surface having a first optical zone and an opposite posterior surface having a second optical zone. Preferably, the first optical zone and second optical zone are circular zones which is rotationally symmetric around the optical axis. It is understood that the first and second optical zones can have shape other than circular.

The first optical zone is defined by a mathematical function including a conic term and at least one $4^{th}$ or higher order mathematic term. The first optical zone, in combination with the opposite second optical zone, provides a negative spherical aberration of from about 1 diopter to about 5 diopters at a 3 mm radius from the optical zone.

As used herein "negative spherical aberration" in reference to a lens means that the optical power decreases as the value of diameter increases. The amount of spherical aberration depends on the diameter (or radius). For a lens having a negative spherical aberration, its optical power at the center is larger than an optical power at any diameter. It should be understood that where a lens having a negative power (e.g., −6 diopters), its optical power at any diameter is more negative than its optical power at the center.

The optical axis is an imaginary line passing through both the centers of the first and second optical zones.

In accordance with the invention, the optical axis of a contact lens can be the central axis which passes through the geometrical centers of the anterior and posterior surfaces.

In a preferred embodiment, the optical axis coincides substantially with the line-of-sight (LOS) of an eye. It is believed that with higher levels of aberrations, it becomes more critical to align the refractive correction over the eye's line of sight, not the center of the lens.

The line of sight (LOS), as known to a person skilled in the art is an imaginary line that connects the fixation point to the center of the entrance pupil and the center of the exit pupil to the fovea. LOS has been recommended by a task force sponsored by the Optical Society of American to be used as the reference axis for the measurement and reporting of the optical aberration of the eye (Applegate, et al., in Vision Science and Its Applications, OSA Technical Digest (Optical Society of America, Washington D.C.), 2000:146–149, herein incorporated by reference in its entirety). Usually, LOS is denoted by angle κ measured from pupillary axis. The pupillary axis is an axis strikes the corner at right angles and passes through the center of the entrance pupil.

In accordance with the invention, the line of sight of an eye can be measurement data of an eye of an individual or preferably characteristic data representing statistically the line of sight of eyes of individuals from a population.

Any suitable method can be used to obtain the line of sight of an eye. For example, one can obtain the LOS of an eye through wavefront data and corneal topography of the eye fixated in primary gaze.

Due to the decentration of the fovea (typically temporal and inferior) and the eye's aberrations, the line of sight of the eye is not typically aligned to the geometric or mechanical axis of the eye. In such case, the contact lens will not provide optimal visual adjustment to the images conveyed to the eye of the wearer.

It is understood that the exact positioning of the optical zone may depend on where the lens sits on the eye. It is discovered that the center of a typical contact lens (e.g., spherical lens) is not precisely aligned to the geometrical (or mechanical center) of the eye, but is located below the geometrical center of the eye, e.g., typically about 200 μm below the geometrical center of the eye. Such deviation of the geometrical center of a contact lens on an eye from the geometrical center of the eye (or the center of the cornea) can be determined, for example, by using a test lens. Preferably, the test lens has a visually marked optical center. More preferably, the test lens has a diameter and a curvature of the posterior surface (or base curve), which are almost identical to a contact lens to be designed and produced. Therefore, it is advantageous to determine deviation of the optical center of a contact lens on an eye from the geometrical center of the eye and then to use such data in the re-designing of the contact lens of the invention so that the optical axis coincides substantially with the line of sight of the eye.

The position of the optical center of the lens and the center of the cornea can be measured with an eye tracking system. An example of such system is the ViewPoint EyeTracker system available from Arrington Research, Inc. In the preferred embodiment, the positional measurement will be made several minutes after the lens is on eye—after the lens has stabilized in primary gaze (looking at a far away object).

Where the optical axis coincides substantially with POS of the eye, the optical center of the contact lens deviates from the geometrical center of the lens. Under this circumstance, it requires orientation stabilization features incorporated in a lens, preferably in a peripheral zone surrounding the optical zone. Any suitable orientation stabilization features can be used. Various orientation stabilization features have been disclosed in the prior art, including without limitation, various prism ballast designs, peri-ballast designs in which the prismatic thickness profile changes are confined in non-optical zone(s) surrounding the optical zone of the lens, dynamic stabilization features disclosed in UN published patent application No. 2002/0071094. Preferred examples includes orientation stabilization features disclosed in co-pending U.S. patent application No. 60/472,365 filed May 21, 2003 (herein incorporated by reference in its entirety) and in U.S. Pat. No. 6,467,903 (herein incorporated by reference in its entirety).

The co-pending U.S. patent application No. 60/472,365 discloses a contact lens which comprises an anterior surface and an opposite posterior surface, wherein the anterior surface includes: a vertical meridian, a horizontal meridian, a central optical zone, a peripheral zone, an edge zone, a first blending zone extending outwardly from the central optical zone to the peripheral zone and providing a continuous transition from the central optical zone to the peripheral zone, a second blending zone extending outwardly from the peripheral zone to the edge zone and providing a continuous transition from the peripheral zone to the edge zone. The anterior surface has a mirror symmetry with respect to a vertical meridian plane and is continuous at least in first derivative. The contact lens is weighed at its lower half portion by varying lens thickness within the peripheral zone and second blending zone to cause it to come to an equilibrium position on the eye and has a lens thickness profile characterized by that lens thickness, in a sector bounded by two sector-bounding semi-meridians at about 35 degrees or larger relative to the lower portion of the vertical meridian and by a portion of the edge included between the two sector-bounding semi-meridians, increases gradually from the inner boundary of the inner boundary of the peripheral zone along each semi-meridian until reaching a lens thickness maximum and then decreases.

Preferably, the lens thickness profile is further charaterized by that: (1) the lens thickness, along the upper portion of the vertical meridian, of the contact lens in the peripheral zone remains substantially constant or increases gradually from the outer boundary of the peripheral zone to the inner boundary of the peripheral zone in a manner that the difference between the values of lens thickness at two intersection points of the upper portion of the vertical meridian with the outer and inner boundaries of the peripheral zone is less than 50%, preferably by less than 30%, more preferably less than 15%; and/or (2) the lens thickness, along the lower portion of the vertical meridian, of the contact lens in the peripheral zone increases gradually from the inner boundary of the peripheral zone to the outer boundary of the peripheral zone in a manner that the difference between the values of lens thickness at two intersection points of the lower portion of the vertical meridian with the inner and outer boundaries of the peripheral zone is from about 15% to about 65%.

A "vertical meridian", in reference to the anterior surface of a contact lens, refers to an imaginary line running vertically from the top, through the geometric center, to the bottom on the anterior surface, when said lens is maintained at a predetermined orientation on an eye. A "horizontal meridian", in reference to the anterior surface of a contact lens, refers to an imaginary line running horizontally from the left side, through the center, to the right side on the anterior surface, when said lens is maintained at a predetermined orientation on an eye. The horizontal and vertical meridians are perpendicular to each other.

A "outer boundary", in reference to a zone other than a central optical zone on the anterior surface of a contact lens, refers to one of two peripheral boundaries of that zone which is further away from the geometric center of the anterior surface.

An "inner boundary", in reference to a zone other than a central optical zone on the anterior surface of a contact lens, refers to one of two peripheral boundaries of that zone which is closer to the geometric center of the anterior surface.

A "semi-meridian" refers to an imaginary line running radially from the geometric center of the anterior surface of a contact lens to the edge of the contact lens.

The "upper portion of the vertical meridian" refers to one half vertical meridian that is above the geometric center of the anterior surface of a contact lens, when said lens is maintained at a predetermined orientation on an eye.

The "lower portion of the vertical meridian" refers to one half vertical meridian that is below the geometric center of the anterior surface of a contact lens, when said lens is maintained at a predetermined orientation on an eye.

A "continuous transition", in reference to two or more zones, means that these zones are continuous at least in first derivative, preferably in second derivative.

A "vertical meridian plane" refers to a plane that cuts through the optical axis of a contact lens and a vertical meridian on the anterior surface of the contact lens.

A "sector", in reference to the anterior surface of a contact lens, means an area bounded by two sector-bounding semi-meridians at an equal angle relative to the lower portion of the vertical meridian and by a portion of the edge included between the two sector-bounding semi-meridians. The edge included between the two sector-bounding semi-merdians is the sum of a first portion of the edge between one of the two semi-meridians and the lower porion of the vertical meridian and a second portion of the edge between the other semi-meridian and the lower porion of the vertical meridian.

Two "sector-bounding semi-meridians" refer to two semi-meridians which divides the anterior surface into two sectors.

"Lens thickness" refers to a shortest distance from a point on the anterior surface to the posterior surface of a contact lens.

A "percentage of difference between two values of lens thickness" is obtained by first subtracting the smaller value from the larger value and then dividing the subtracting result with the larger value and finally multiplying it with 100.

A "blending zone" refers to a non-optical zone located between two zones and providing a continuous transition between these two zones.

The presence of a first blending zone can allow to separately and independently design the central optical zone and the peripheral zone, so as to ensure a continuous transition from the central optical zone to the peripheral zone. With a first blending zone between the central optical zone and the peripheral zone, a contact lens can be produced to have flexion points and/or sharp boundaries at the junction between two zones being eliminated and thereby provide improved wearer's comfort. In addition, the first blending zone between the central optical zone and the peripheral zone can de-couple the optical features and the mechanical stabilization features of the lens, thus preventing the introduction of prism into the optics. The first blending zone has a surface that ensures that the peripheral zone, the first blending zone and the central optical zone are tangent to each other. The blending zone can be any surface described by a mathematical function, preferably a spline-based mathematical function, or made of different tangent surface patches.

"Tangent surface patches" refer to combinations of surfaces with curvatures that are continuous in first derivative, preferably in second derivative, from each other.

The peripheral zone can be composed of one or more peripheral bands or regions which are patched together to form a continuous surface. It is discovered that, when a contact lens has in the peripheral zone and the second blending zone a lens thickness profile as described above, such contact lens can be maintained effectively at a predetermined orientation on an eye. Like a conventional lens ballast, the orientation feature of the invention works by weighing the lens at its lower half portion, causing it to come to an equilibrium position on the eye. With such orientation feature, the optical zone of the anterior surface can be designed independently to provide an optimal visual performance.

Lens thickness can also have a value ranging between about 110 to about 150 micrometers in the central 90% of the peripheral zone along the upper portion of the vertical meridian. Actual values will depend on material properties and base curve (posterior surface) parameters.

Lens thickness at the intersection point of the lower portion of the vertical meridian with the inner boundary of the central 90% of the peripheral zone is preferably from about 200 micrometers to about 280 micrometers; lens thickness at the intersection point of the lower portion of the vertical meridian with the outer boundary of the central 90% of the peripheral zone is from about 320 micrometers to about 400 micrometers. Actual values will depend on material properties and base curve (posterior surface) parameters.

The size of the sector can be varied. The sector is bound by two sector-bounding semi-meridians preferably at about 90 degrees, more preferably at about 120 degree, even more preferably about 135 degree, relative to the lower portion of the vertical meridian and the edge included between the two sector-bounding semi-meridians. In those preferred embodiments, lens thickness maximums along the horizontal meridian are preferably from about 200 micrometers to about 300 micrometer. Where the sector is bound by two sector-bounding semi-meridians preferably at about 120 degree relative to the lower protion of the vertical meridian and the edge included between the two sector-bounding semi-meridians, lens thickness, in this sector, increases gradually along each semi-meridian until reaching a lens thickness maximum and then decreases whereas in the other remaining sector lens thickness remains substantially constant or increases gradually, along each semi-meridian within this remaining sector, from the outer boundary of the peripheral zone to the inner boundary of the peripheral zone in a manner that the difference between the values of lens thickness at two intersection points of any semi-meridian with the outer and inner boundaries of the peripheral zone is less than 15%.

Lens thickness maximums along semi-meridians are preferably located slightly inside of, alone or slightly outside of the outer boundary of the peripheral zone within the sector. More preferably, lens thickness maximums along semi-meridians are located slightly outside (less than 0.4 mm) of the outer boundary the peripheral zone within the sector.

Distances between the edge of the lens and any points along the outer boundary of the peripheral zone within the sector are preferably from about 0.6 mm to about 2.0 mm.

Preferably, the entire peripheral zone of a contact lens of the invention has a continuity in first derivative and/or in second derivative. Such peripheral zone can be a continuous surface defined by one or more mathematical functions, preferably by a spline-based mathematical function, or is made of several different surface patches.

In accordance with the present invention, the optical power of a contact lens at its optical center (where the optical axis passes through) is approximately equal to the manifest distance refractive power. As used herein "manifest refraction" means a user's subjective best correction for an eye. The "manifest corrective refractive power" means a refractive power required for achieving a user's subjective best correction for an eye.

Typically, a contact lens of the invention has a power profile in which the optical power of the lens decreases outwardly from the optical center (or axis) to the outer periphery such that the optical power at a 6 mm diameter (or 3 mm radius) is from about 1 to 5 diopters smaller than the manifest refractive power for the eye.

A lens according to one embodiment of the invention can be preferably designed by generating a model of a lens. The model includes a description of the anterior and posterior surface of a contact lens.

The posterior surface can be any surface capable of accommodating the cornea shape of an eye. The posterior surface can be defined by a conic function. For example, the anterior surface is formed by defining a spherical curve in the Y-Z plane, wherein the Z-axis passes through the apex (center) of the spherical curve in normal direction, and then rotating this spherical curve around the Z-axis.

The first optical zone can be formed by defining a curve in the Y-Z plane, wherein the Z-axis passes through the apex (center) of that curve in normal direction, and then rotating that curve around the Z-axis. In a preferred embodiment, the curve is defined by equation (1)

$$z = \frac{cy^2}{1+\sqrt{1-(1+k)c^2y^2}} + \sum_{i=4} \alpha_i y^i \quad (1)$$

where c is the curvature (the reciprocal of the radius) at the center, k, is a conic constant, and $\alpha_i$ is a coefficient.

It is well known to those skilled in the art that the optical power of a contact lens is, inter alia, a function of the index of refraction of the lens material and the algebraic difference between the curvatures of the anterior surface and the posterior surface of the lens. The first optical zone (of the anterior surface) and the second optical zone (of the posterior surface) combine to provide an optical power profile in which the optical power of the lens decreases outwardly from the optical axis (center) to the outer periphery such that the optical power at a 6 mm diameter (or 3 mm radius) is from about 1 to 5 diopters smaller than the manifest refractive power for the eye.

By using an optical computer aided design (CAD) system and a mechanical CAD system, one can design a contact lens of the invention.

An optical CAD system is used to design an optical model lens. "An optical model lens" refers to an ophthalmic lens that is designed in a computer system and generally does not contain other non-optical systems which are parts of an ophthalmic lens. Exemplary non-optical systems of a contact lens include, but are not limited to bevel, lenticular, and edge that joins the anterior and posterior surfaces of a contact lens.

"A bevel" refers to a non-optical surface zone located at the edge of the posterior surface of a contact lens. Generally, the bevel is a significantly flatter curve and is usually blended with the base curve (optical posterior surface) of a contact lens and appears as an upward taper near the edge. This keeps the steeper base curve radius from gripping the eye and allows the edge to lift slightly. This edge lift is important for the proper flow of tears across the cornea and makes the lens fit more comfortable.

"A lenticular" refers to a non-optical surface zone of the anterior surface of a contact lens between the optical zone and the edge. The primary function of the lenticular is to control the thickness of the lens edge. Preferably, one or more orientation stabilization features are incorporated in the lenticular. The lenticular and the first optical zone can be separated by a blending zone which provides continuous transition from the optical zone to the lenticular (i.e., a continuous anterior surface).

Any known, suitable optical computer aided design (CAD) system may be used to design an optical model lens. Exemplary optical computer aided design systems includes, but are not limited to Advanced System Analysis program (ASAP) from Breault Research Organization and ZEMAX (Focus Software, Inc.). Preferably, the optical design will be performed using Advanced System Analysis program (ASAP) from Breault Research Organization with input from ZEMAX (Focus Software, Inc.).

The design of the optical model lens can be transformed by, for example, a mechanical CAD system, into a mechanical lens design that includes optical zones, non-optical zones and non-optical features. Exemplary non-optical zones and features of a contact lens include, but are not limited to bevel, lenticular, edge that joins the anterior and posterior surfaces of a contact lens. Preferably, when transforming the design of an optimized optical model lens into a mechanical lens design, some common features of a family of contact lenses can be incorporated.

Any known, suitable mechanical CAD system can be used in the invention. Preferably, a mechanical CAD system capable of precisely representing mathematically high order surfaces is used to design a contact lens. An example of such mechanical CAD system is Pro/Engineer.

A contact lenses of the invention can be either hard or soft lenses. Soft contact lenses of the invention is preferably made from a soft contact lens material, such as a silicon hydro-gel or HEMA. It will be understood that any lens described above comprising any soft contact lens material would fall within the scope of the invention.

After completing a desired design, the lens design can be converted into a data file containing control signals that is interpretably by a computer-controlled manufacturing device. A computer-controlled manufacturing device is a device that can be controlled by a computer system and that is capable of producing directly a contact lens or an optical tools for producing a contact lens. Any known, suitable computer controllable manufacturing device can be used in the invention. Preferably, a computer controllable manufacturing device is a numerically controlled lathe, preferably a two-axis lathe with a 45° piezo cutter or a lathe apparatus disclosed by Durazo and Morgan in U.S. Pat. No. 6,122,999, herein incorporated by reference in its entirety, more preferably a numerically controlled lathe from Precitech, Inc., for example, such as Optoform® ultra-precision lathes (models 30, 40, 50 and 80) having Variform® piezo-ceramic fast toll servo attachment.

A contact lens of the invention may be produced by any convenient means, for example, such as lathing and molding. Preferably, contact lenses are molded from contact lens molds including molding surfaces that replicate the contact lens surfaces when a lens is cast in the molds. For example, an optical cutting tool with a numerically controlled lathe may be used to form metallic optical tools. The tools are then used to make convex and concave surface molds that are then used, in conjunction with each other, to form the lens of the invention using a suitable liquid lens-forming material placed between the molds followed by compression and curing of the lens-forming material.

Preferably, a contact lens of the invention or the optical tool to be used for making the same is fabricated by using a numerically controlled lathe, for example, such as Optoform® ultra-precision lathes (models 30, 40, 50 and 80) having Variform® or Varimax® piezo-ceramic fast tool servo attachment from Precitech, Inc.

The invention, in another aspect, provides a method for producing a contact lens of the invention as described above. The method comprises the steps of shaping a contact lens by a manufacturing means to have an optical axis, an anterior surface having a first optical zone, and an opposite posterior surface having a second optical zone. The first optical zone is defined by a mathematical function including a conic term and at least one $4^{th}$ or higher order mathematic term. The first optical zone, in combination with the opposite second optical zone, provides a negative spherical aberration of from about 1 diopter to about 5 diopters at a 3 mm radius from the opitacl axis.

In a further aspect, the present invention provides a series of contact lenses capable of correcting different vision deficiencies, wherein each contact lens in the series comprises an optical axis, an anterior surface having a first optical zone and an opposite posterior surface having a second optical zone, wherein the posterior surface of each lens in the series is substantially identical to each other. The first optical zone of each lens is defined by a mathematical function including a conic term and at least one $4^{th}$ or higher order mathematic term. The first optical zone of each lens, in combination with its opposite second optical zone, provides a negative spherical aberration of from about 1 diopter to about 5 diopters at a 3 mm radius from the optical axis.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A contact lens for a specified contact lens user, comprising: an optical axis, an anterior surface having a first optical zone and an opposite posterior surface having a second optical zone, wherein first optical zone is defined by a mathematical function including a conic term and at least one $4^{th}$ or higher order mathematic term, and wherein the anterior surface, in combination with the opposite second optical zone, provides a power profile in which the optical power of the lens decreases outwardly from the optical axis to the outer periphery such that the optical power at a 6 mm diameter is from about 1 to 5 diopters smaller than a manifest refractive power for an eye of the specified user and said contact lens correcting for severe spherical aberration.

2. The contact lens of claim 1, wherein the optical power at a 6 mm diameter is from about 1.5 to 3.5 diopters smaller than the manifest refractive power for the eye.

3. The contact lens of claim 1, wherein the first optical zone is formed by rotating a curve in Y-Z plane around Z-axis, wherein the Z-axis passes through the apex of the curve in normal direction, and wherein the curve is defined by equation (1)

$$z = \frac{cy^2}{1 + \sqrt{1-(1+k)c^2y^2}} + \sum_{i=4} a_i y^i \quad (1)$$

wherein c is the curvature at the center, k is a conic constant, $\alpha_i$ is a coefficient.

4. The contact lens of claim 1, wherein the optical axis coincides substantially with a central axis which passes through the geometrical centers of the anterior and posterior surfaces.

5. The contact lens of claim 1, wherein the optical axis coincides substantially coincident with the line-of-sight of the eye.

6. The contact lens of claim 3, wherein the optical axis coincides substantially coincident with the line-of-sight of the eye.

7. A method for producing a contact lens for a specified contact lens user, the method comprising the steps of shaping a contact lens by a manufacturing means to have an optical axis, an anterior surface having a first optical zone, and an opposite posterior surface having a second optical zone, wherein the first optical zone is defined by a mathematical function including a conic term and at least one $4^{th}$ or higher order mathematic term, and wherein the first optical zone, in combination with the opposite second optical zone, provides a power profile in which the optical power of the lens decreases outwardly from the optical axis to the outer periphery such that the optical power at a 6 mm diameter is from about 1 to 5 diopters smaller than a manifest refractive power for an eye of the specified user and contact lens capable of correcting for severe spherical aberration.

8. The method of claim 7, wherein said manufacturing means is a numerically controlled lathe to produce the lenses, or molds for making the lenses.

9. The method of claim 8, wherein the contact lens has a power profile in which the optical power of the lens decreases outwardly from the center to the outer periphery such that the optical power at a 6 mm diameter is from about 1.5 to 3.5 diopters smaller than the manifest refractive power for the eye.

10. The method of claim 8, wherein the anterior surface is designed by rotating a curve in Y-Z plane around Z-axis, wherein the Z-axis passes through the apex of the curve in normal direction, and wherein the curve is defined by equation (1)

$$z = \frac{cy^2}{1 + \sqrt{1 - (1+k)c^2 y^2}} + \sum_{i=4} \alpha_i y^i \qquad (1)$$

wherein c is the curvature at the center, k is a conic constant, $\alpha_i$ is a coefficient.

11. The method of claim 8, further comprising the steps of: obtaining information about the line of sight of the eye; designing the first and second optical zones in a way such that the optical axis coincides substantially with the line of sight of the eye.

12. The method of claim 11, wherein the step of obtaining information is performed by obtaining wavefront data and corneal topography of the eye fixated in primary gaze.

13. The method of claim 11, wherein the step of obtaining information is performed by obtaining measurement data from the position of a test lens relative to the center of the cornea of the eye using an eye tracking system with the eye fixated in primary gaze.

14. A series of contact lenses each of a specified user, each contact lens in the series comprising an optical axis, an anterior surface having a first optical zone and an opposite posterior surface having a second optical zone, wherein the posterior surface of each lens in the series is substantially identical to each other, wherein the first optical zone of each lens is defined by a mathematical function including a conic term and at least one $4^{th}$ or higher order mathematic term, wherein the first optical zone of each lens, in combination with its opposite second optical zone, provides a power profile in which the optical power of the lens decreases outwardly from the optical axis to the outer periphery such that the optical power at a 6 mm diameter is from about 1 to 5 diopters smaller than a manifest refractive power for an eye of the specified user and each contact lens of the series correcting for severe spherical aberration.

15. The series of contact lenses of claim 14, wherein the optical power at a 6 mm diameter is from about 1.5 to 3.5 diopters smaller than the manifest refractive power for the eye.

16. The series of contact lens of claim 14, wherein the first optical zone is formed by rotating a curve in Y-Z plane around Z-axis, wherein the Z-axis passes through the apex of the curve in normal direction, and wherein the curve is defined by equation (1)

$$z = \frac{cy^2}{1 + \sqrt{1 - (1+k)c^2 y^2}} + \sum_{i=4} \alpha_i y^i \qquad (1)$$

wherein c is the curvature at the center, k is a conic constant, $\alpha_i$ is a coefficient.

17. The series of contact lens of claim 14, wherein the optical axis coincides substantially with a central axis which passes through the geometrical centers of the anterior and posterior surfaces.

18. The series of contact lens of claim 14, wherein the optical axis coincides substantially coincident with the line-of-sight of the eye.

19. The series of contact lenses of claim 16, wherein the optical axis coincides substantially coincident with the line-of-sight of the eye.

20. The series of contact lens of claim 18, wherein the line-of-sight (LOS) of the eye is determined from characteristic data representing statistically the line of sight of eyes of individuals from a population.

* * * * *